United States Patent [19]

Beck et al.

[11] 4,136,735

[45] Jan. 30, 1979

[54] HEAT EXCHANGE APPARATUS INCLUDING A TOROIDAL-TYPE RADIATOR

[75] Inventors: Harold D. Beck, Downers Grove; C. Paul Kolthoff, Jr., Naperville, both of Ill.

[73] Assignee: International Harvester Company, Chicago, Ill.

[21] Appl. No.: 728,657

[22] Filed: Oct. 1, 1976

Related U.S. Application Data

[63] Continuation-in-part of Ser. No. 543,713, Jan. 24, 1975, abandoned, which is a continuation of Ser. No. 472,257, May 22, 1974, abandoned.

[51] Int. Cl.² .............................................. F28F 9/22
[52] U.S. Cl. .................................. 165/125; 123/41.49; 415/DIG. 1
[58] Field of Search ............... 165/125, 51; 123/41.49, 123/41.57; 415/DIG. 1, 210

[56] References Cited

U.S. PATENT DOCUMENTS

| | | | |
|---|---|---|---|
| 2,145,621 | 1/1939 | Falco | 165/125 |
| 2,260,594 | 10/1941 | Young | 165/125 |
| 2,267,425 | 12/1941 | Rowe et al. | 165/125 |
| 2,362,955 | 11/1944 | Cantwell | 165/125 |
| 2,812,925 | 11/1957 | Young | 165/125 |
| 3,144,859 | 8/1964 | Walton | 123/41.49 |
| 3,759,321 | 9/1973 | Ares | 165/125 |
| 3,800,866 | 4/1974 | Ireland et al. | 165/125 |
| 3,978,919 | 9/1976 | Fachbach et al. | 165/125 |

OTHER PUBLICATIONS

Applications of the Coanda Effect, Scientific American, vol. 214, No. 6, 6-66, pp. 84-92.

*Primary Examiner*—Charles J. Myhre
*Assistant Examiner*—Sheldon Richter
*Attorney, Agent, or Firm*—Frederick J. Krubel; F. David AuBuchon

[57] ABSTRACT

Heat exchange apparatus including a toroidal-type radiator having radially extending cooling air passage-ways formed through the core thereof, a rotary fan positioned radially inwardly of the radiator core, and fan shroud means shaped and positioned with respect to the radiator core and the blades of the fan whereby the air stream induced by the fan during operation has a major component in a radial direction.

40 Claims, 10 Drawing Figures

HEAT EXCHANGE APPARATUS INCLUDING A TOROIDAL-TYPE RADIATOR

The present application is a continuation in part of copending Patent application Ser. No. 543,713, filed Jan. 24, 1975 now abandoned, assigned to the assignee of the present Patent application which, in turn, is a continuation of Patent application Ser. No. 472,257, filed May 22, 1974, now abandoned, and also assigned to the assignee of the present Patent application.

BACKGROUND OF THE INVENTION

This invention relates generally to a heat exchange assembly or apparatus for use in conjunction with a liquid-cooled internal combustion engine employed in a motor vehicle and, more particularly, to a new and improved heat exchange apparatus which includes a toroidal-type radiator assembly including an annular core having radially extending, air cooling passageways formed therethrough, rotary fan means for inducing an air stream, and a contoured fan shroud structure for directing the fan-induced air stream radially through the radially extending, cooling air passageways of the annular radiator core efficiently without a significant reduction in the velocity pressure of the fan induced air stream caused by redirection thereof from an axial direction to a radial direction when the rotary fan means is of the blower type or, from a radial direction to an axial direction when the rotary fan means is of the suction type. The heat exchange apparatus of the present invention is also effective to cause the velocity of the air stream passing through the radiator core to be substantially uniform axially across the cylindrical air intake face of the radiator core.

Most vehicles generally in use today, such as passenger cars and motor trucks, are propelled by internal combustion engines and such engines, as is well known, generate heat during the operation thereof. For the most part, the motor vehicle internal combustion engines employed are of the liquid-cooled type which entail the circulation, under pressure, of a coolant through the engine for absorbing heat. The correct operating temperature of the engine is maintained by subsequently and sequentially passing, under pressure, the heated coolant received from the engine through a heat exchange system or apparatus for dissipating heat from the coolant to the atmosphere and returning the coolant to the engine for recirculation therein. Generally, the heat exchange apparatus employed includes a heat exchanger or radiator through which the heated coolant received from the engine is caused to flow. Simultaneously, cooling air is also caused to flow through the radiator which absorbs heat from the heated coolant and carries it out into the atmosphere.

The cooling capacity of a heat exchange apparatus is dependent upon many factors including the velocity and volume of the air caused to flow through radiator core as well as the distribution pattern of the air stream over the available heat exchange surface of the radiator core. Ideally, to achieve the highest heat transfer efficiency of any heat exchange apparatus, it is desirable that the velocity of cooling air flowing through the radiator core be as high as possible and be uniformly distributed over the entire available heat exchange surface of the radiator core. The heat exchange apparatus almost universally found in conventional motor vehicles propelled by liquid-cooled internal combustion engines involves a radiator or heat exchanger assembly which has a flat, generally rectangularly-shaped core structure. The radiator is usually oriented so as to be generally upright and is positioned axially forwardly of the engine. The heat exchange apparatus of conventional motor vehicles also includes, for the most part, a rotary fan of the axial flow, suction type which is positioned intermediate the engine and the flat radiator. The fan is designed to suck or draw air from the atmosphere forwardly of the radiator structure and cause the air stream induced thereby to flow substantially axially through the radiator. Heretofore, in most motor vehicle installations, the air stream after passing through the radiator core was discharged back over the engine which, as pointed out hereinbefore, is usually spaced axially rearwardly of the fan and radiator structure.

The rotary fan used in most motor vehicle engine heat exchange apparatuses for propelling the cooling air through the radiator core includes a multi-bladed rotor. The fan impeller blades extend radially from the fan hub and thus the fan blade tips circumscribe a circle when the fan is being operated. Because the cooling air intake and discharge faces of the flat radiator core are rectangular in shape and since the fan blade tips circumscribe a circle, the air flow distribution pattern is not uniform over the entire available area of the flat radiator core. In fact, it has been found that very little, if any, of the cooling air stream induced by the fan actually passes through the four corner face areas of the radiator core. The addition of a conventional venturi type fan shroud to the heat exchange installation in an attempt to minimize velocity pressure losses of the air stream does little, if anything, toward the problem of improving the air flow at the four corner areas of the radiator core air intake face.

Automotive cooling system engineers have long been intrigued with the possibility of overcoming the aforementioned operational shortcomings as well as other inherent and well known heat transfer deficiencies of traditional automotive heat exchange systems by using a toroidal type heat exchanger in lieu of the conventional flat, radiator. In a toroidal heat exchanger the radiator core is, in effect, wrapped around the fan and resembles a drum shell with the air stream intake and discharge faces of the radiator core in the form of radially spaced and parallel concentric cylinders. The fan, which is encircled by the radiator core, may be a blower type wherein cooling air is drawn axially from one axial side of the fan impeller blades and discharge radially outwardly through the radiator core or, alternatively, the fan may be a suction type wherein cooling air is drawn radially inwardly through the toroidal radiator core and discharged axially from one axial side of the heat exchange apparatus.

However, automotive cooling system engineers have not had much success in the adaptation and utilization of toroidal radiators in motor vehicle engine cooling systems prior to the present invention. The typical installation took the form of a round or toroidal radiator, a venturi type fan shroud, and a blower type, axial flow fan, as disclosed in U.S. Pat. No. 3,800,866. In such a typical installation, cooling air is drawn axially from one side of the round radiator by the fan, which is located coaxially with respect to the round or toroidal radiator, and is discharged, in a generally axial direction, under pressure, to the plenum chamber or space defined by the radially innermost cylindrical face of the toroidal radiator core. Inasmuch as the cooling air passageways of a conventional toroidal radiator core extend radially through the core it is necessary to provide elaborate baffle means or other air flow guiding means for "bending" the air stream to, thus, change the direction of fan-generated air stream from a generally axial direction to a generally radial direction. The resulting direction change of the air stream, however, was accompanied by a diminution of the velocity pressure of the air stream. Furthermore, the velocity of the air flowing over the radiator core was non-uniformly distributed over such available heat exchange surface. As a consequence, the use of toroidal radiators in conjunction with motor vehicle engine cooling systems has not become widespread as initially contemplated.

SUMMARY OF THE INVENTION

One of the prime objectives of the present invention is to provide a heat exchange apparatus, including a heat exchanger in the form of a toroidal or round radiator, wherein the operational shortcomings and heat transfer deficiencies of prior heat exchange apparatuses employing toroidal radiators have been, to a large extent, obviated.

The present invention contemplates the provision of a heat exchange apparatus or system wherein an axial flow, rotary fan is positioned adjacent one axial end of a toroidal radiator which encircles the fan. The toroidal radiator includes an annular core provided with a plurality of radially extending passageways therethrough for the circulation of the cooling air stream generated or induced by the fan. The fan-induced air stream has a major velocity component which is substantially normal or perpendicular to the rotational axis of the fan.

The pressure gradient bending of the fan-induced air stream so that it has a major velocity component extending in a generally radial direction and, thus, in the direction of the cooling air passageways of the annular radiator core, is accomplished by utilizing a unique fan shroud structure in conjunction with a conventional multi-bladed, axial flow fan which may be either a suction type or a blower type. The combination of the contoured fan shroud structure and axial flow fan is capable of promoting pressure gradient "bending" at the fan-generated air stream passing over the fan shroud structure with substantially no loss in the velocity pressure of such air stream resulting from such "bending" thereof.

In accordance with the present invention, an annular contoured fan shroud structure, configured to produce a Coanda-like effect on the fan-generated air stream as it passes over the surface of the fan shroud structure, is positioned at one axial end of a toroidal radiator. Preferably, the contoured fan shroud structure is of the type shown and described in U.S. Pat. No. 3,872,916, assigned to the assignee of the present invention. A multi-bladed, axial flow fan, in turn, is axially and radially positioned with respect to the contoured fan shroud structure and the toroidal radiator core in a unique and novel manner. As a result the above-mentioned heat transfer deficiencies and operational shortcomings of prior art heat exchange apparatuses utilizing toroidal radiators and conventional multi-bladed, axial flow cooling air fans of either the suction or blower type are substantially mitigated if not totally eliminated.

More particularly, the present invention contemplates utilization of the fan shroud structure and the particular positioning of the fan impeller blades with respect to such fan shroud structure, as shown and described in the aforementioned U.S. Pat. No. 3,872,916, in order to achieve the objectives of the invention. It has been discovered that by forming the fan shroud structure so as to provide a generally cylindrical throat section CF, a radial flat section RF, axially and radially spaced from the throat section CF, and a radial and axial expander or diverging section R, serving as a transition between the throat section CF and the radial flat section RF, by dimensioning such fan shroud sections in accordance with the effective axial width (AW) of the fan impeller blades, and by positioning the fan and, thus, the fan impeller blades, with respect to such specifically dimensioned fan shroud sections and the toroidal heat exchanger or radiator, in a manner as will be described hereinafter, the overall performance of the heat exchange apparatus is improved immensely. With the heat exchange apparatus of the present invention, a radial air flow pattern is generated with substantially no loss in the velocity pressure of the air stream as it changes its direction approximately 90%. Furthermore, it has been found that the velocity pressure of the fan-induced air stream is substantially the same across all of the available air intake surface of the toroidal radiator core.

It is, therefore, an object of the invention to provide means for improving the cooling air velocity distribution over the generally cylindrical inlet face or surface of a toroidal heat exchanger or radiator to thereby enhance the cooling efficiency of the heat-exchange apparatus.

The foregoing and other important objects and desirable features inherent in and encompassed by the invention, together with many of the purposes and uses thereof, will become readily apparent from reading of the ensuing description in conjunction with the annexed drawings, in which,

DESCRIPTION OF THE PREFERRED EMBODIMENTS

Figure 1:
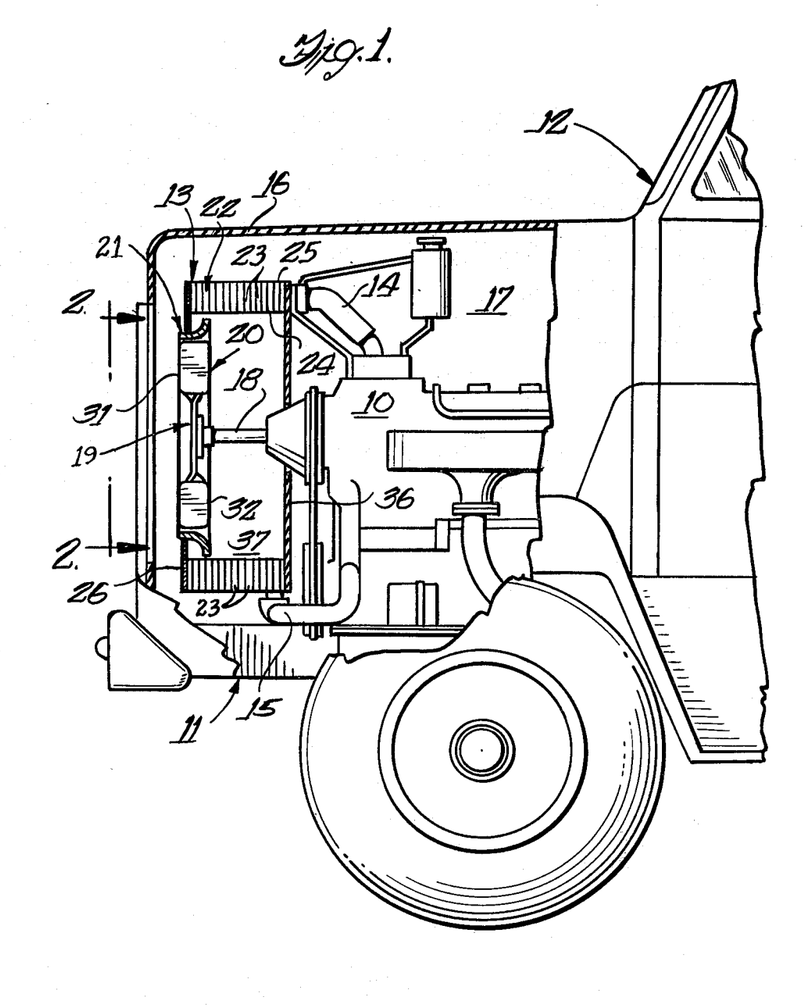
FIG. 1 is a side elevational view of the forwardmost portion of a motor vehicle provided with a liquid cooled internal combustion engine and embodying the heat exchange apparatus of the present invention, for controlling the engine coolant temperature, part of the structure is broken away and in section to better illustrate the invention.
Figure 2:
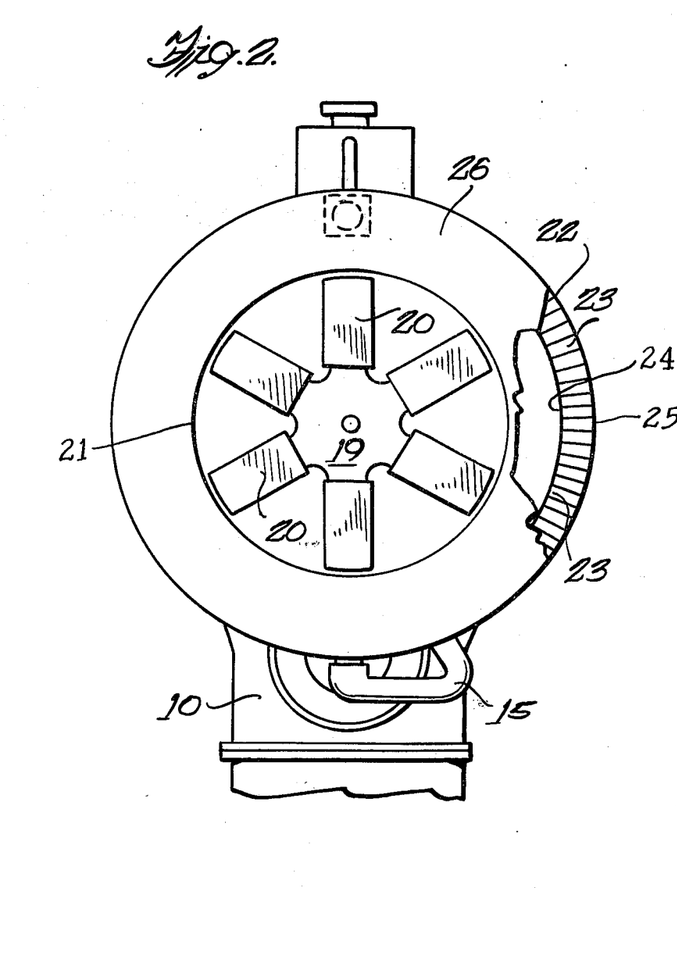
FIG. 2 is a front elevational view taken substantially along line 2—2 of FIG. 1, part of fan shroud and radiator structure is broken away in order to illustrate the radial orientation of the air cooling passageways provided in the radiator core.

Referring to the drawings in detail, wherein like reference characters represent like elements throughout the various views, there is shown a conventional liquid-cooled, heat-producing internal combustion engine 10 carried forwardly on longitudinally extending, frame support means 11 of a motor vehicle 12, partially shown in FIG. 1. As shown herein, the motor vehicle 12 is a conventional motor truck. It is to be understood, however, as will hereinafter become more apparent, the heat exchange apparatus of the present invention can be applied to any type of vehicle employing any type of heat-generating engine, whether of the internal or external combustion type or to any other heat exchange system, whether portable or stationary, and whether used in conjunction with an engine or not.

Mounted forwardly of the engine 10 is a liquid cooling radiator 13 employed to dissipate the engine generated heat. Water or other engine coolant flows between the water jacket (not shown) of the engine 10 and the radiator 13 through a pair of coolant inlet and outlet hose means 14, 15, respectively. In this particular embodiment, sheet metal structure 16, partially shown in FIG. 1, substantially encloses the engine 10 thereby partially defining the engine compartment space 17.

Projecting forwardly at the forward end of the engine 10 is an engine-driven fan shaft 18, as shown in FIG. 1, whereby power is delivered to rotate an axial flow, blower type fan 19. It is to be understood, that the particular means for driving the fan 19 is not critical as far as the invention is concerned. Thus, in lieu of the direct drive transmission illustrated, conventional belt and pulley combinations and/or auxiliary drive devices, electric motors, hydraulic motors and the like, could be employed. As used here, the air stream-producing means is a rotatable blower type, multi-bladed fan 19 which is axially spaced forwardly of the engine 10 and is encircled by the radiator 13. The fan 19 includes a plurality of circumferentially spaced, radially extending impeller blades 20 and is capable of generating a flow of air during normal operation of the engine 10 and such air flow is directed by fan shroud means, designated generally by reference numeral 21. The fan shroud means 21 may be supported in a number of different ways and by various structures such as directly by the radiator 13, as shown, or by being integrally mounted with the fan so as to be free to move with respect to the radiator.

The particular means employed for supporting the fan shroud means 21 is immaterial as far as the present invention is concerned. The heat exchanger means or radiator 13 is of the annular or toroidal type. The radiator core 22 is in the form of a cylinder and resembles the shell of a drum. The radiator core 22 is provided with a plurality of air passageway means 23 which extend generally radially through the core between an annular interior face 24 and an annular exterior face 25 of the radiator core 22. The fan shroud means 21 is suitably connected to the forwardmost wall 26 of the radiator structure 13. Suitable sealing means (not shown) are provided for sealing around the entire periphery of the fan shroud means 21 and the forwardmost wall 26 of the radiator structure whereby the connection between such components is relatively free of gaps or spaces which would allow the passage of air. In the preferred form of the invention, the entire forwardmost wall 26 of the radiator structure 13 is substantially sealed against the passage of air at the joint between such radiator wall 26 and the fan shroud means 21.

Figure 3:
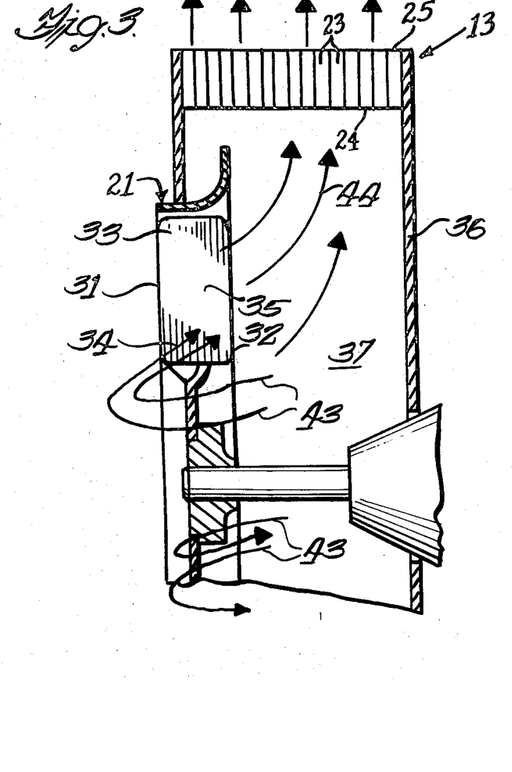
FIG. 3 is a fragmentary, vertical sectional view of a heat exchange apparatus embodying the invention, certain portions of the apparatus are shown schematically.
Figure 4:
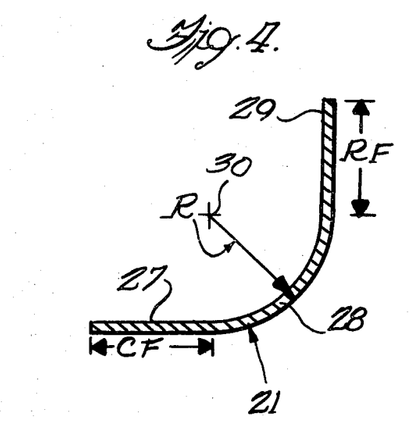
FIG. 4 is an enlarged detailed, vertical sectional view of the annular contoured fan shroud used in all of the embodiments of the invention.

The fan shroud means 21 of the present invention includes a generally cylindrical throat section 27, a curved or contoured section 28, and a radially extending flat flange section 29, as best illustrated in FIG. 4. In the embodiment of the invention illustrated in FIG. 1 the cylindrical throat section 27 serves as the entrance structure for the cooling air stream. The curved, contoured or arcuate section 28 extends generally axially rearwardly toward the engine 10 and radially outwardly from the rearwardmost edge of the cylindrical throat section 27. The contoured section 28 has a radius of curvature R which extends from an infinite number of reference points 30, all of which lie substantially in a plane containing the forwardmost edge of the fan shroud cylindrical throat section 27 which also defines the forwardmost end of the fan shroud means 21. In the embodiment of the invention illustrated in FIGS. 1 and 3, the radius of curvature R is substantially constant. The radial flat flange section 29 of the fan shroud means 21 defines the rearwardmost end of the fan shroud means 21 and lies generally in a radial plane perpendicular to the longitudinal axis of the fan drive shaft 18. The forwardmost edge of the cylindrical throat section 27 defines the forwardmost end of the fan shroud means 21, as stated above, and lies substantially in a radial plane axially spaced from and generally parallel with respect to the radial plane containing the radial flat flange section 29. The aforementioned reference points 30 also lie in a circle having a diameter equal to the diameter of the cylindrical throat section 27 plus twice the radius of curvature R. That is, the arcuate or curved shroud section 28 has a generally bell-shaped appearance, being a section of a transition surface or some approximation thereof. Overall, the entire fan shroud means 21 has a horn-like configuration.

As pointed out hereinbefore, one of the prime objects of the invention is to substantially mitigate, if not totally eliminate, the heat transfer deficiencies and operational shortcomings of prior art heat exchange apparatuses utilizing toroidal radiators and conventional multi-bladed, axial flow cooling air fans and such objective is, in the main, achieved by utilizing a fan shroud structure capable of producing pressure gradient bending of the air stream substantially 90° without sacrificing to any great degree the velocity pressure of the air stream. It was pointed out and explained in detail in U.S. Pat. No. 3,872,916 that the basic phenomenon which contributes to the realization of a generally smooth and relatively turbulent-free air stream flowing radially to or from the air cooling fan is believed to be the Coanda-like effect generated by the passage of such fan-generated air stream over the surface of the particular fan shroud disclosed in the patent. As stated hereinbefore, the present invention is primarily concerned with the utilization of such Coanda-like effect to improve the overall performance and efficiency of a heat exchange apparatus including a toroidal type radiator. The achievement of the Coanda-like effect and, hence, the objectives of the present invention is dependent upon many factors including the contour or surface of the fan shroud, the radial and axial positioning of the fan impeller blades with respect to the fan shroud, and the dimensions of the various countoured sections of the fan shroud with respect to the dimensions of the fan impeller blades, and in particlar, the effective axial width AW of the fan impeller blades. In order to clearly understand the invention and its operation, the definition of the effective axial width AW of a fan impeller blade 20 as used herein is that dimension measured along the rotational axis of the fan 19 between a pair of spaced and parallel planes which are disposed substantially perpendicular to the rotational axis of the fan 19, each of which contains a point disposed, respectively, on the leading edge 31 or the trailing edge 32 at the radially outermost blade tip region or portion 33 of the fan impeller blade 20, such outermost blade tip region 33 having a radial length of approximately ⅓ of the radial length of the blade 20. Inasmuch as the fan impeller blades 20 illustrated in the drawings are of the straight sided type, as distinguished from other common fan blade designs such as tapered or curved types, substantially the entire leading edge 31 happens to lie in one of the two parallel planes between which the effective axial width AW of the fan impeller blade is measured and substantially the entire trailing edge 32 happens to lie in the other plane. In other words, the effective axial width AW, as defined above, of a straight sided fan impeller blade whether measured at the hub region or portion 34, which region or portion 34 has a radial length of approximately ⅓ of the radial length of the fan impeller blade 20, or at the intermediate or middle region or portion 35, or at the radially outermost tip portion or region 33, since all of such axial width measurement values are substantially the same. However, by definition, the effective axial width AW of a taper sided fan impeller blade would always have to be smaller than the axial width of the fan impeller blade as measured at the middle region 35 and considerably smaller than the axial width of the fan impeller blade as measured at the hub region 34 of the impeller blade. Obviously, the contrary would be true in the case of a "reverse" taper sided fan impeller blade design. Furthermore, in a fan impeller blade design of the tapered type, the leading edge may be tapered while the trailing edge of the impeller blade is disposed in a plane perpendicular to the rotational axis of the fan. Alternatively, the trailing edge of the blade may be tapered and the leading edge disposed in a plane normal to the axis of rotation of the fan. In certain tapered fan impeller designs, both the leading edge and the trailing edge of the blade are tapered, each of which lie substantially in a plane inclined at an angle with respect to the rotational axis of the fan which is either greater or less than 90°. However, it is to be understood that regardless of whether the fan impeller design is of the straight sided type, taper sided (one side or both) type, curved sided type, or a hybrid version of such type, effective axial width AW of the fan impeller blade is always measured or determined as pointed out hereinbefore and preferably, as also pointed out hereinbefore, the fan is axially positioned so that one of the pair of parallel planes, which are disposed substantially perpendicular to the rotational axis of the fan and used to establish the axial limits of the effective axial width AW, substantially passes through the radial flat flange section 29 of the fan shroud means 21 and the other plane of such pair of parallel planes substantially coincides with the plane containing the opposite axial end of the fan shroud means 21.

Thus, the fan 19 illustrated in FIG. 3 is an axial flow, blower type and is preferably axially positioned with respect to the fan shroud means 21 so that the forwardmost end of the fan shroud means 21 lies substantially in the plane perpendicular to the rotational axis of the fan 19 and contains the leading edges 31 of the fan impeller blades 20 (since the fan impeller blades 20 illustrated are of the straight sided type) or, stated in another way, one of the two parallel planes defining the limits or axial length of the effective axial width AW of the fan impeller blades 20. It is also preferable to dimension and position the fan impeller blades 20 in such a manner that the plane containing the trailing edges 32 (or the other plane of the two parallel planes defining the limits of the effective axial width AW of the impeller blades 20) also contains the opposite axial end or the rearwardmost end, as viewed in FIG. 3, of the fan shroud means 21. As best shown in FIG. 1, the fan 19 is surrounded or encircled by the fan shroud means 21 and is operable to establish a flow of cooling air through the radiator core 22 in a radial direction.

Additionally, it is preferable to dimension the various fan shroud sections such as the cylindrical throat section 27, curved section 28, and radially extending flat flange section 29 in accordance with the disclosure of the aforementioned U.S. Pat. No. 3,872,916. Thus, for achieving optimum results, the cylindrical throat section 27 or CF should have a value of approximately AW/3, R, the radius of curvature of the curved section 28 should be substantially 2AW/3, and the radial flat flange section 29 or RF should have a value of approximately AW/3.

It should be understood, however, that the above-emphasized preferred spatial relationship of the fan and fan shroud means and the fan shroud section sizes can be varied up to a distance or amount equal to plus or minus 12 percent of the effective axial width AW of the fan impeller blades 20 and still obtain the beneficial results of the invention. Thus, the plane containing one axial end of the fan shroud means 21 can be axially spaced or offset an axial distance of 0.12 AW from the plane containing the leading edges 31 of the fan impeller blades 20 without departing from the spirit and scope of the invention. Similarly, the plane containing the fan impeller blade trailing edges 32 may be axially spaced the same amount from the plane defining the rearwardmost or other axial end of the fan shroud means 21. Furthermore, the cylindrical throat shroud section 27 or CF can have an axial length or value of AW/3 plus or minus the amount of 0.12 AW, R, the radius of curvature of the curved shroud section 28, can have a value of 2AW/3 plus or minus the amount of 0.12/AW, and the radial flat shroud section 29 or RF can have a radial length or value of AW/3 plus or minus the amount of 0.12 AW.

Figure 3A:
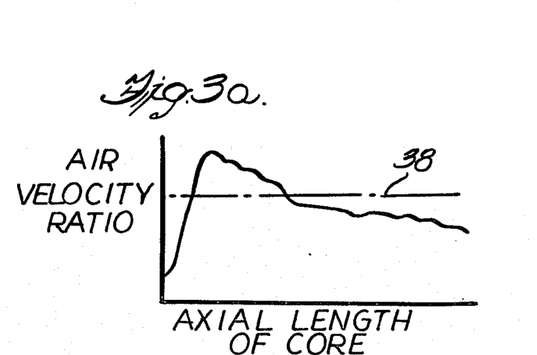
FIG. 3a is a graph illustrating the distribution of the cooling air stream in terms of velocity ratio (air velocity/average air velocity) along the axial length of the toroidal radiator core during operation of the heat exchange apparatus shown in FIG. 3.

In the embodiment of the invention illustrated in FIG. 3, the toroidal radiator structure 13 includes a rear wall 36, which is axially spaced and substantially parallel to the forwardmost wall 26. The rear wall 36 is provided with a central circular opening to accommodate the fan shaft 18 therethrough. It is to be understood that the annular clearance gap between the fan shaft 18 and the circular edge surface of the rear wall 36 defining the opening is relatively small and just sufficient to permit the fan shaft 18 to project through the rear wall 36 without interference. The forwardmost wall 26 and the rear wall 36 define the axial limits of a plenum chamber, designated generally by reference numeral 37. During the operation of the fan 19 illustrated in FIG. 3, cooling air is drawn generally axially from the exterior side of the forwardmost wall 26 of the toroidal radiator structure 13 and is discharged, under pressure, to the plenum chamber 37. However, the air stream entering the plenum chamber 37 has a major velocity component in a radial, as distinguished from an axial direction, and such directional change of the fan generated air stream from a generally axial direction to a generally radial direction is accomplished without elaborate baffle means or other air flow guiding means for "bending" the air stream substantially 90°. Furthermore, the resulting direction change of the air stream is also accomplished without a substantial diminution of the velocity pressure of the air stream. It will also be noted, as illustrated in FIG. 3a, that the velocity of the air flowing through the toroidal radiator core 22 is more uniformly distributed over the available axial length of the radiator core 22 than in conventional arrangements, as will be apparent hereinafter. The graph of FIG. 3a graphically illustrates the distribution pattern of the cooling air stream flowing radially through the toroidal radiator core 22 in terms of air velocity ratio (air velocity/average air velocity) along the available axial length of the toroidal radiator core 22 during operation of the cooling air fan 19. The horizontal broken line 38 represents the average air velocity of the air stream flowing radially through the radiator core 22. It will be appreciated that the velocity of the air flowing through the annular portion of the toroidal radiator core 22 adjacent the forwardmost wall 26 of the radiator structure 13 is considerably less than the average velocity of the air stream flowing through the radiator core 22. It will also be noted that the velocity of the air flowing through the rearwardmost two-thirds of the radiator core 22, while less than the average velocity, is relatively close thereto.

Figure 7:
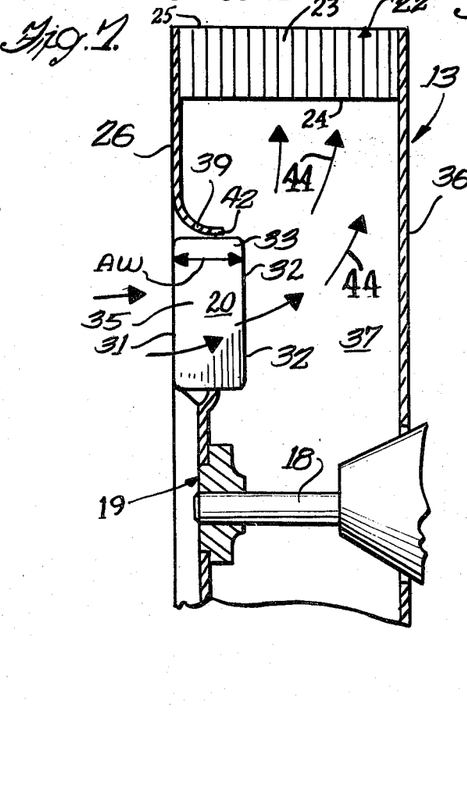
FIG. 7 is a fragmentary, vertical sectional view of a typical prior art heat exchange apparatus including a toroidal type radiator and a venturi type fan shroud structure.
Figure 7A:
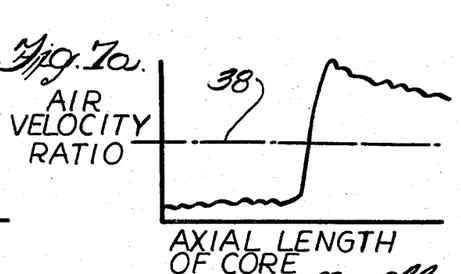
FIG. 7a is a graph illustrating the distribution of the cooling air stream along the toroidal radiator core during operation of the prior art heat exchange apparatus shown in FIG. 7.

Referring to FIG. 7, a typical and well known prior art design of a toroidal heat exchange apparatus is illustrated. It should be appreciated that the present day state of the art is such that the heat exchange apparatus illustrated in FIG. 7 is considered to be a generally efficient and fairly well accepted by the industry. A structure comparable to that illustrated in FIG. 7 is shown in U.S. Pat. No. 3,800,866. The fan shroud of the usual or conventional toroidal heat exchange apparatus is in the form of a venturi section 39. The venturi section 39 may be integral with the forwardmost wall 40 of the toroidal radiator structure, designated generally by numeral 41, as shown or suitably connected thereto in such a manner that there is substantially no air gap between the venturi section 39 and the circular opening in the forwardmost wall 40 in which the venturi section 39 is disposed. The rearwardmost edge 42 of the fan shroud 39 lies generally in a radial plane substantially parallel and axially spaced substantially midway between the radial plane containing the trailing and leading edges 32, 31, respectively, of the fan impeller blades 20. FIG. 7a is a graph similar to FIG. 3a, referred to above, showing the distribution pattern of the air flowing through the toroidal core 22 of the radiator structure 41. As pointed out hereinbefore, for best heat transfer efficiency, it is desirable that the velocity of the air flowing through the toroidal radiator core 22 be as uniform as possible across the entire axial width of the core. Referring to the graph of FIG. 7a, it will, thus, be obvious that the heat transfer efficiency of conventional arrangements are adversely effected by the resulting nonuniform nature of air distribution pattern. That part of the total air stream flowing through the radiator core 22 passing through the axially rearwardmost half of the annular radiator core 22 does so at a relatively high velocity and well above the average air velocity all of the air flowing through the toroidal radiator core 22 while that portion of the air stream passing through the forwardmost half of the radiator core 22 does so at a much smaller velocity. Consequently, substantially less air passes through the forwardmost axial portion of the core 22. It will be appreciated, therefore, that the forwardmost half of the radiator core 22 is not being utilized as efficiently as the rearwardmost half of the radiator core 22 and, hence, the overall heat transfer efficiency of the apparatus is substantially reduced. Furthermore, since the air being discharged into the plenum chamber 37 of the radiator structure 41 has a major velocity component in an axial direction, the rearwardmost wall 36, of necessity, must serve as a baffle or deflector for changing the direction of the air stream 90°. Obviously, in order to accomplish such air direction change, the average velocity pressure of the air stream generated by the fan 19 suffers and is substantially diminished. As a result, the efficiency of the fan 19 is lowered considerably. By comparing FIGS. 3a and 7a, it will be obvious the apparatus of the present invention distributes the air stream relative evenly over the entire available heat transfer surface of the radiator core 22 and conventional toroidal radiator assemblies, on the other hand, do not achieve such a high degree of uniformity of air distribution over the entire available heat transfer surface of the radiator core. The average air velocity of the air flowing through the radiator core 22 of the present invention is much larger than the average air velocity of the air stream flowing through the core 22 of a conventional toroidal radiator apparatus. Thus, with the present invention, a more uniform air flow distribution pattern is achieved and such achievement is coupled with a material increase in the operating efficiency of the air propelling means or fan 19. Thus, the fan 19 utilized in the embodiment of the invention, shown in FIG. 3, vis-a-vis the same fan 19 associated with the conventional toroidal radiator apparatus, shown in FIG. 7, generates a much greater volume of cooling air flowing through the radiator core 22 than the volume of air flow generated by the exact same fan 19 operating at the same operational speed but incorporated in a conventional toroidal radiator apparatus. Stated in another way, the fan 19 associated with the apparatus of the present invention can be operated at a considerably lower speed than the fan 19 associated with a conventional toroidal radiator apparatus for a given air flow rate. Obviously, by being able to lower the operating speed of a fan for a given air flow demand the horsepower consumption of the fan is lowered and the noise generated by the fan is decreased.

Figure 5:
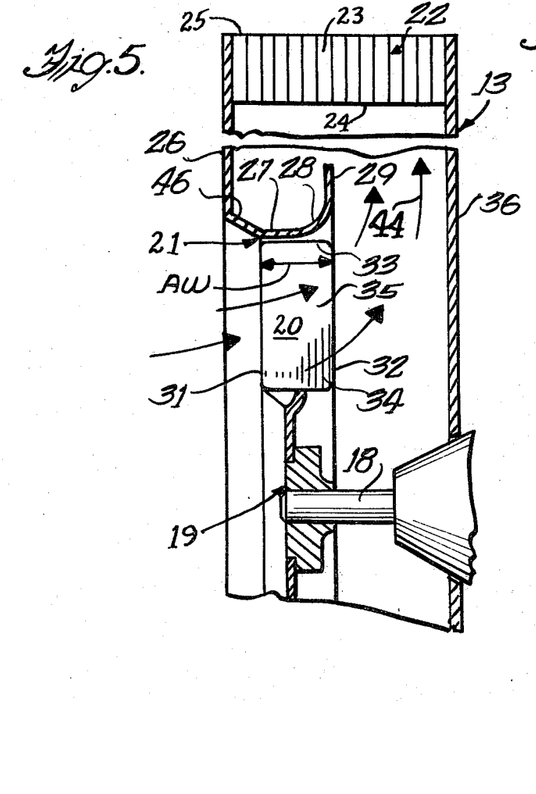
FIG. 5 is a view similar to FIG. 3 showing a slightly modified version of the heat exchange apparatus illustrated in FIG. 3.

In the embodiment of the invention illustrated in FIG. 5, the size of the radiator core 22 with respect to the diameter of the fan 19 and fan shroud means 21, as well as the axial location of the fan 19 and the fan shroud means 21, have been optimized to obtain substantially full axial spread of the air stream across the entire interior air intake face 24 of the radiator core 22. More specifically, the diameter of the fan shroud means 21 and, consequently, the diameter of the fan 19, of the embodiment of the invention shown in FIG. 5 are chosen so as to be much smaller than the diameter of the core interior face 24 in comparison to the diameters of the fan shroud means 21 and fan 19 in relation to the diameter of the core interior face 24 of the embodiment of the invention shown in FIG. 3. The fan 19 and thus the fan shroud means 21 is positioned axially inwardly a substantial distance from the forwardmost wall 26 of the radiator structure 13 such that the radial plane containing the radial flat flange section 29 of the fan shroud means 21 is axially spaced approximately midway between the axial end walls 26, 36 of the toroidal radiator structure 13. The spatial relationship between the fan 19 and the fan shroud means 21 is the same as the spatial rationship between the same two components of the other embodiments of the invention described above. In order to axially position the fan shroud means 21, as pointed out above, it is necessary to provide an annular entrance shroud section 46 which serves to bridge the axial distance between the forwardmost wall 26 of the radiator structure 13 and the forwardmost end of the cylindrical throat section 27 of the fan shroud means 21 so as to ensure substantially all of the cooling air entering the air-receiving plenum chamber 37 does so through the fan 19. Substantially even or uniform distribution of the fan-generated air stream over substantially the entire available air intake face 24 of the toroidal radiator core 22 is partially achieved by axially centering the fan blast discharge in the plenum chamber 37 and by taking advantage of the fact that an air stream normally diverges at an angle of about 7° (3½° to both sides of the center line) from its source. By selecting the relative diameters of the toroidal radiator core 22 and the fan shroud means 21, and hence, the fan 19, adequate radial distance can be provided between the "source" of the air stream (where the air leaves the radial flat flange section 29 or RF) and the cylindrical air intake face 24 of the radiator core 22 so that the radially directed air stream is permitted to diverge sufficiently and be spread substantially entirely across the cylindrical inner intake face 24 of the toroidal radiator core 22.

Figure 6:
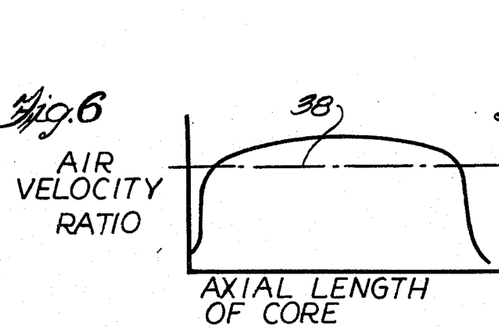
FIG. 6 is a graph similar to FIG. 3a showing the distribution of the cooling air stream along the radiator core during operation of the heat exchange apparatus shown in FIG. 5.

As clearly shown by observing the graph shown in FIG. 6, the velocity pressure of the air stream flowing through the annular radiator core 22 is substantially uniform throughout the axial length of the core 22. Only those relatively small annular portions of the toroidal radiator core 22 adjacent the forwardmost wall 26 and the rearwardmost wall 36 of the radiator core 22 are not being utilized to their fullest capacities. However, the velocity pressure of the air stream flowing through the radiator core 22 of the apparatus shown in FIG. 5 but for the small annular portions of the core 22 mentioned above, is substantially uniform. It will also be observed that the average air velocity of the air stream is greater than the velocity of the air stream flowing through the radiator core 22 of the apparatus, shown in FIG. 3, and dramatically greater than the average air velocity of the air stream flowing through the radiator core 22 of the conventional heat exchange apparatus, illustrated in FIG. 7 as evidenced by viewing the graph shown in FIG. 7a.

Figure 8:
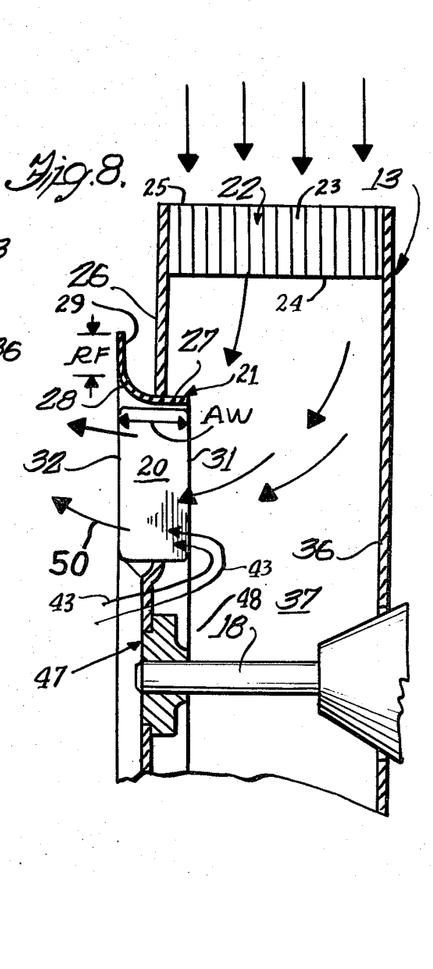
FIG. 8 is a fragmentary, vertical sectional view of a heat exchange apparatus embodiment of the invention which includes a cooling air fan of the axial flow, suction type.

The inventive concept of the present invention can be applied to a toroidal heat exchange apparatus utilizing an axial flow, suction type fan 47, as distinguished from a blower type fan. The toroidal radiator structure 13 utilized in the embodiment of the invention illustrated in FIG. 8 is of substantially the same size and configuration as the toroidal radiator structure 13 described above with reference to the embodiment of the invention shown in FIG. 3. Similarly, the fan shroud means 21 is contoured exactly like the fan shroud means 21 of the heat exchange apparatus illustrated in FIG. 3 but faces in an opposite direction. In other words, the radial flat flange section 29 or RF of the fan shroud means 21 is disposed exteriorly of the plenum chamber 37 and is axially spaced forwardly of the forwardmost wall 26 of the radiator structure 13. The impeller blades 20 of the axial flow, suction type fan 47 are axially positioned with respect to the fan shroud means so that the radial flat flange section 29 lies substantially in the plane perpendicular to the rotational axis of the fan 47 and contains the trailing edges 32 of the fan impeller blades 20 (since the fan impeller blades 20 illustrated are of the straight sided type) or, stated in another way, one of the two parallel planes defining the limits or axial length of the effective axial width AW of the fan impeller blades 20. The radial plane containing the leading edges 31 (or the other plane of the two parallel planes definining the limits of the effective axial width AW of the impeller blades 20) also substantially contains the opposite axial end or rearwardmost end, as viewed in FIG. 8, of the fan shroud means 21. As shown in FIG. 8, the fan 47 is surrounded or encircled by the fan shroud means 21 and is operable to establish a flow of cooling air radially inwardly through the toroidal radiator core 22 from the exterior thereof. The cooling air drawn radially into the plenum chamber 37 is discharged by the fan 47 in a generally radial direction and exteriorly of the plenum chamber 37. It has been found that the heat exchange apparatus illustrated in FIG. 8 is capable of achieving a relatively high operating efficiency by substantially reducing the fan drive power per unit of air moved through the toroidal radiator core 22 and by reducing the fan generated noise level per unit of cooling air moved through the radiator core 22.

The embodiments of the invention chosen for the purposes of illustration and description herein are those preferred for achieving the objects of the invention and developing the utility thereof in the most desirable manner, due regard being had to the existing factors of economy, simplicity of design and construction, production methods, and the improvements sought to be effected. It will be appreciated, therefore, that the particular functional and structural aspects emphasized herein are not intended to exclude, but rather to suggest, such other adaptations and modifications of the invention as fall within the spirit and scope of the invention as defined in the appended claims.

What is claimed is:

1. A heat exchange apparatus comprising:
   a heat exchanger means including a toroidal radiator structure, said toroidal radiator structure including a toroidal radiator core having a plurality of radially extending cooling air passageways formed therethrough, said toroidal radiator structure further including a first radially extending wall and a second radially extending wall axially spaced and substantially parallel with respect to said first wall, said first and second walls substantially defining the axial limits of said toroidal radiator core and an air-receiving plenum chamber disposed radially inwardly of said toroidal radiator core;

a rotatable, axial flow fan having a plurality of circumferentially spaced, radially extending impeller blades; and a generally annular fan shroud means supported within an opening formed through said first wall and encircling the fan, said fan shroud means including a generally cylindrical, axially extending throat section, an annular, generally radially extending flat flange section, said flat flange section being spaced radially outwardly and axially in a direction downstream from said throat section and having a radial length substantially equal to the axial length of said cylindrical throat section, said fan shroud means being positioned with respect to said toroidal radiator structure whereby said flat flange section lies substantially in a plane spaced and parallel with respect to said first and second walls, and an annular intermediate section extending between and operatively interconnecting said throat section and said radial flat flange section, said throat section, intermediate section, and radial flat flange section being effective to produce a low pressure region between the air stream flowing over the surface thereof and such surface when the fan is in operation.

2. A heat exchange apparatus as set forth in claim 1, wherein said axial flow fan is of the blower type, said fan drawing air generally axially from the exterior of said toroidal radiator structure and discharging the same into said plenum chamber, said fan-generated air stream discharged into said plenum chamber having a major velocity component in a radially outward direction.

3. A heat exchange apparatus as set forth in claim 2, wherein said throat, intermediate, and radial flat flange sections of said annular fan shroud means are axially spaced intermediate said first and second walls.

4. A heat exchange apparatus as set forth in claim 3, wherein said annular shroud means further includes an annular shroud section operatively interconnecting and extending between said throat section and said first wall.

5. A heat exchange apparatus as set forth in claim 1, wherein said axial flow fan is of the suction type, said fan drawing air generally axially from said plenum chamber and discharging the same exteriorly of said toroidal radiator structure, said fan-generated air stream discharged exteriorly of said toroidal radiator structure having a major velocity component in a radially outward direction.

6. A heat exchange apparatus as set forth in claim 5, wherein said generally radially extending flat flange section of said fan shroud means is disposed exteriorly of said air-receiving plenum chamber.

7. A heat exchange apparatus as set forth in claim 1, wherein said throat, intermediate, and radial flat flange sections of said annular fan shroud means are axially spaced intermediate said first and second walls.

8. A heat exchange apparatus as set forth in claim 7, wherein said annular shroud means further includes an annular shroud section operatively interconnecting and extending between said throat section and said first wall.

9. A heat exchange apparatus as set forth in claim 1, wherein said impeller blades have an effective axial width, AW, measured along the rotational axis of the fan between a first plane and a second plane, said planes being axially spaced and parallel with respect to each other and disposed substantially normal to the rotational axis of the fan, said first and second planes extending radially, respectively, through a point on the leading edge of each of the impeller blades at the radially outermost, tip region thereof and through a point on the trailing edge of each of the impeller blades at the radially outermost, tip region thereof, the radially outermost, tip region of each of said impeller blades having a radial length of approximately ⅓ of the radial length of the impeller blade, said fan being axially positioned with respect to said fan shroud means whereby one of said first first and second planes is axially spaced from and on either axial side of a radial plane containing a first axial end of said throat section a distance of 0 to 12 percent of AW; and wherein said intermediate section extends between and operatively interconnects a second axial end of said throat section and said radial flat flange section.

10. A heat exchange apparatus as set forth in claim 9, wherein said axial flow fan is of the suction type, said fan drawing air generally axially from said plenum chamber and discharging the same exteriorly of said toroidal radiator structure, said fan-generated air stream discharged exteriorly of said toroidal radiator structure having a major velocity component in a radially outward direction.

11. A heat exchange apparatus as set forth in claim 10, wherein said generally radially extending flat flange section of said fan shroud means is disposed exteriorly of said air-receiving plenum chamber.

12. A heat exchange apparatus as set forth in claim 9, wherein said throat, intermediate, and radial flat flange sections of said annular fan shroud means are axially spaced intermediate said first and second walls.

13. A heat exchange apparatus as set forth in claim 12, wherein said annular shroud means further includes an annular shroud section operatively interconnecting and extending between said throat section and said first wall.

14. A heat exchange apparatus as set forth in claim 9, wherein said axial flow fan is of the blower type, said fan drawing air generally axially from the exterior of said toroidal radiator structure and discharging the same into said plenum chamber, said fan-generated air stream discharged into said plenum chamber having a major velocity component in a radially outward direction.

15. A heat exchange apparatus as set forth in claim 14, wherein said throat, intermediate, and radial flat flange sections of said annular fan shroud means are axially spaced intermediate said first and second walls.

16. A heat exchange apparatus as set forth in claim 15, wherein said annular shroud means further includes an annular shroud section operatively interconnecting and extending between said throat section and said first wall.

17. A heat exchange apparatus as set forth in claim 14, wherein said throat, intermediate, and radial flat flange sections of said annular fan shroud means are axially spaced intermediate said first and second walls.

18. A heat exchange apparatus as set forth in claim 17, wherein said annular shroud means further includes an annular shroud section operatively interconnecting and extending between said throat section and said first wall.

19. A heat exchange apparatus as set forth in claim 9, wherein the other one of said first and second planes is axially spaced from and on either axial side of a radial plane containing the juncture of said intermediate section and said radial flat flange section a distance of 0 to 12 percent of AW.

20. A heat exchange apparatus as set forth in claim 19, wherein said axial flow fan is of the blower type, said fan drawing air generally axially from the exterior of said toroidal radiator structure and discharging the same into said plenum chamber, said fan-generated air stream discharged into said plenum chamber having a major velocity component in a radially outward direction.

21. A heat exchange apparatus as set forth in claim 20, wherein said throat, intermediate, and radial flat flange sections of said annular fan shroud means are axially spaced intermediate said first and second walls.

22. A heat exchange apparatus as set forth in claim 21, wherein said annular shroud means further includes an annular shroud section operatively interconnecting and extending between said throat section and said first wall.

23. A heat exchange apparatus as set forth in claim 19, wherein said axial flow fan is of the suction type, said fan drawing air generally axially from said plenum chamber and discharging the same exteriorly of said toroidal radiator structure, said fan-generated air stream discharged exteriorly of said toroidal radiator structure having a major velocity component in a radially outward direction.

24. A heat exchange apparatus as set forth in claim 23, wherein said generally radially extending flat flange section of said fan shroud means is disposed exteriorly of said air-receiving plenum chamber.

25. A heat exchange apparatus as set forth in claim 19, wherein said throat, intermediate, and radial flat flange sections of said annular fan shroud means are axially spaced intermediate said first and second walls.

26. A heat exchange apparatus as set forth in claim 25, wherein said annular shroud means further includes an annular shroud section operatively interconnecting and extending between said throat section and said first wall.

27. A heat exchange apparatus as set forth in claim 19, wherein said one of said first and second planes is substantially coincident with said radial plane containing a first axial end of said throat section, and said other one of said first and second planes is substantially coincident with said radial plane containing the juncture of said intermediate section and said radial flat flange section.

28. A heat exchange apparatus as set forth in claim 27, wherein said axial flow fan is of the blower type, said fan drawing air generally axially from the exterior of said toroidal radiator structure and discharging the same into said plenum chamber, said fan-generated air stream discharged into said plenum chamber having a major velocity component in a radially outward direction.

29. A heat exchange apparatus as set forth in claim 27, wherein said axial flow fan is of the suction type, said fan drawing air generally axially from said plenum chamber and discharging the same exteriorly of said toroidal radiator structure, said fan-generated air stream discharged exteriorly of said toroidal radiator structure having a major velocity component in a radially outward direction.

30. A heat exchange apparatus as set forth in claim 29, wherein said generally radially extending flat flange section of said fan shroud means is disposed exteriorly of said air-receiving plenum chamber.

31. A heat exchange apparatus as set forth in claim 27, wherein said throat, intermediate, and radial flat flange sections of said annular fan shroud means are axially spaced intermediate said first and second walls.

32. A heat exchange apparatus as set forth in claim 31, wherein said annular shroud means further includes an annular shroud section operatively interconnecting and extending between said throat section and said first wall.

33. A heat exchange apparatus as set forth in claim 27, wherein in said intermediate section is radially curved, and wherein the following relationships exist: $RF = AW/3$ plus or minus 12 percent of AW, $CF = AW/3$ plus or minus 12 percent of AW, and $R = 2AW/3$ plus or minus 12 percent of AW, where RF is is the radial length of the radial flat flange section, CF is the axial length of the cylindrical throat section, and R is the radius of curvature of the intermediate section.

34. A heat exchange apparatus as set forth in claim 33, wherein said axial flow fan is of the suction type, said fan drawing air generally axially from said plenum chamber and discharging the same exteriorly of said toroidal radiator structure, said fan-generated air stream discharged exteriorly of said toroidal radiator structure having a major velocity component in a radially outward direction.

35. A heat exchange apparatus as set forth in claim 34, wherein said generally radially extending flat flange section of said fan shroud means is disposed exteriorly of said air-receiving plenum chamber.

36. A heat exchange apparatus as set forth in claim 33, wherein said throat, intermediate, and radial flat flange sections of said annular fan shroud means are axially spaced intermediate said first and second walls.

37. A heat exchange apparatus as set forth in claim 36, wherein said annular shroud means further includes an annular shroud section operatively interconnecting and extending between said throat section and said first wall.

38. A heat exchange apparatus as set forth in claim 33, wherein said axial flow fan is of the blower type, said fan drawing air generally axially from the exterior of said toroidal radiator structure and discharging the same into plenum chamber, said fan-generated air stream discharged into said plenum chamber having a major velocity component in a radially outward direction.

39. A heat exchange apparatus as set forth in claim 38, wherein said throat, intermediate, and radial flat flange sections of said annular fan shroud means are axially spaced intermediate said first and second walls.

40. A heat exchange apparatus as set forth in claim 39, wherein said annular shroud means further includes an annular shroud section operatively interconnecting and extending between said throat section and said first wall.

* * * * *